(12) United States Patent
Akselrod et al.

(10) Patent No.: US 9,976,869 B2
(45) Date of Patent: May 22, 2018

(54) TEMPORAL SOLAR CAPACITY NAVIGATION

(71) Applicant: International Business Machines Corporation, Armonk, NY (US)

(72) Inventors: Ben Z. Akselrod, Givat Shmuel (IL); Anthony DiLoreto, Markham (CA); Brett G. King, Cary, NC (US); Steve McDuff, Markham (CA); Kyle D. Robeson, North York (CA)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 14/865,399

(22) Filed: Sep. 25, 2015

(65) Prior Publication Data

US 2017/0089721 A1 Mar. 30, 2017

(51) Int. Cl.
*G01C 21/34* (2006.01)
*G01C 21/36* (2006.01)

(52) U.S. Cl.
CPC ..... *G01C 21/3691* (2013.01); *G01C 21/3407* (2013.01)

(58) Field of Classification Search
CPC ............... G01C 21/3407; G01C 21/32; G01C 21/3691; G06F 17/30241; G06F 17/3087
See application file for complete search history.

(56) References Cited

U.S. PATENT DOCUMENTS

| 8,452,642 B2 | 5/2013 | Matsuyama | |
| 8,884,784 B2 | 11/2014 | Kirsch | |
| 2003/0006914 A1* | 1/2003 | Todoriki | B60L 11/184 340/995.21 |
| 2009/0132159 A1 | 5/2009 | Dai et al. | |
| 2009/0254274 A1* | 10/2009 | Kulik | G01S 19/49 701/469 |
| 2011/0249251 A1* | 10/2011 | Lynch | G01C 21/32 356/5.01 |
| 2012/0310536 A1* | 12/2012 | Katayama | G01C 21/3461 702/3 |

FOREIGN PATENT DOCUMENTS

| DE | 102010042411 A1 | 4/2012 |
| WO | 2013113751 A2 | 8/2013 |

OTHER PUBLICATIONS

Bullis, Kevin, "Self-Driving Car Tech Could Help Make Solar Powered EVs Practical", MIT Technology Review, Jan. 2, 2014, 2 pages, <http://www.technologyreview.com/view/523236/self-driving-car-tech-could-help-make-solar-powered-evs-practical/>.
"Sun Surveyor: The Sun & Moon Position Visualization and Tracking App for iOS & Andriod", © 2011-2015 Adam Ratana, printed Jun. 9, 2015, 2 pages, <http://www.sunsurveyor.com/>.

\* cited by examiner

*Primary Examiner* — Stephen Holwerda
(74) *Attorney, Agent, or Firm* — Christopher McLane; Daniel R. Simek (57) ABSTRACT

In an approach for determining temporal solar capacity navigation routes, a computer receives navigation criteria navigation criteria that includes at least a starting location, a destination, a date, a time, and a temporal solar capacity. The computer determines one or more navigation routes based on the received navigation criteria. The computer creates a temporal solar capacity navigation map based on the received navigation criteria. The computer determines one or more suggested navigation routes from the determining one or more navigation routes based on the created temporal solar capacity navigation map.

17 Claims, 3 Drawing Sheets

TEMPORAL SOLAR CAPACITY NAVIGATION

BACKGROUND

The present invention relates generally to the field of navigation systems, and more particularly to providing a navigation route through integration of a temporal solar capacity map.

Renewable energy is capable of replacing conventional fuels in four distinct areas: electricity generation, air and water heating/cooling, motor fuels, and rural (off-grid) energy services. Renewable energy occurs through naturally replenishing resources, based on a human timescale, such as sunlight (e.g., solar energy), wind (e.g., wind power), water (e.g. hydropower), and geothermal heat (e.g., geothermal energy). Solar energy occurs either directly using photovoltaic (PV), or indirectly using concentrated solar power (CSP). Photovoltaic is a method of converting solar energy into direct current electricity using semiconducting materials that exhibit the photovoltaic effect (e.g., creation of voltage or electric current in a material upon exposure to light). A photovoltaic system employs solar panels composed of a number of solar cells that absorb light, separate the charges of carriers, and extract the charges to an external site, the resulting in the supply of usable solar power. Concentrated solar power systems use lenses or mirrors and tracking systems to focus a large area of sunlight into a small beam. Solar vehicles are electric vehicles that are powered completely or substantially by direct solar energy. The term "solar vehicle" usually implies that solar energy is used to power all or part of a vehicle's propulsion, however the solar power may be also used to provide power for communications, controls, or other auxiliary functions.

Through technological advancements, the manner in which individuals navigate and/or plan routes to a destination has evolved. Route planning software designs an optimal route between two geographic locations (e.g., origin and destination, start point and end point, etc.) using a journey planning engine. The journey planning engine suggests one or more routes between the origin and destination that may be optimized for different criteria (e.g., fastest, shortest, least turns, toll roads, expressways, etc.) and marks the routes within an interactive map. The integration of the route planning software into global positioning systems (GPS) and portable navigation systems, allows the combination of positioning capabilities (e.g., GPS) and navigation functions, in order to monitor and control the movement of a vehicle from one location to another along the route. The navigation systems receives signals from satellites through a GPS antenna and combines the data from the satellites with the information received from onboard sensors (e.g., direction sensor, speed sensor, etc.) to identify the position and direction of the vehicle on the route. The navigation system displays the current position and direction of the vehicle on a visual output device (e.g., handheld, embedded console screen, etc.) with respect to the route, and updates the route and electronic maps real time, until reaching the destination.

SUMMARY

Aspects of the present invention disclose a method, computer program product, and system for determining temporal solar capacity navigation routes. The method includes one or more computer processors receiving navigation criteria that includes at least a starting location, a destination, a date, a time, and a temporal solar capacity. The method further includes one or more computer processors determining one or more navigation routes based on the received navigation criteria. The method further includes one or more computer processors creating a temporal solar capacity navigation map based on the received navigation criteria. The method further includes one or more computer processors determining one or more suggested navigation routes from the determined one or more navigation routes based on the created temporal solar capacity navigation map.

DETAILED DESCRIPTION

Electric vehicles equipped with solar panels rely on solar exposure to generate the maximum amount of power and to charge a battery. As recognized by embodiments of the present invention, the amount of solar exposure varies throughout the day depending upon factors that impact solar exposure (e.g., time of year, time of day, weather conditions, geographic location, etc.). Embodiments of the present invention create a temporal solar capacity map taking into account the factors impacting solar exposure, in order to predict the amount of solar exposure relative to a location entered through a navigation system and/or a route planning program. Additionally, embodiments of the present invention utilize the temporal solar map to provide real time and/or future routes through navigation system and/or route planning programs that maximize solar exposure, thus offering the maximum amount of power generation and greatest solar charging opportunity when traveling and/or remaining stationary.

Figure 1:
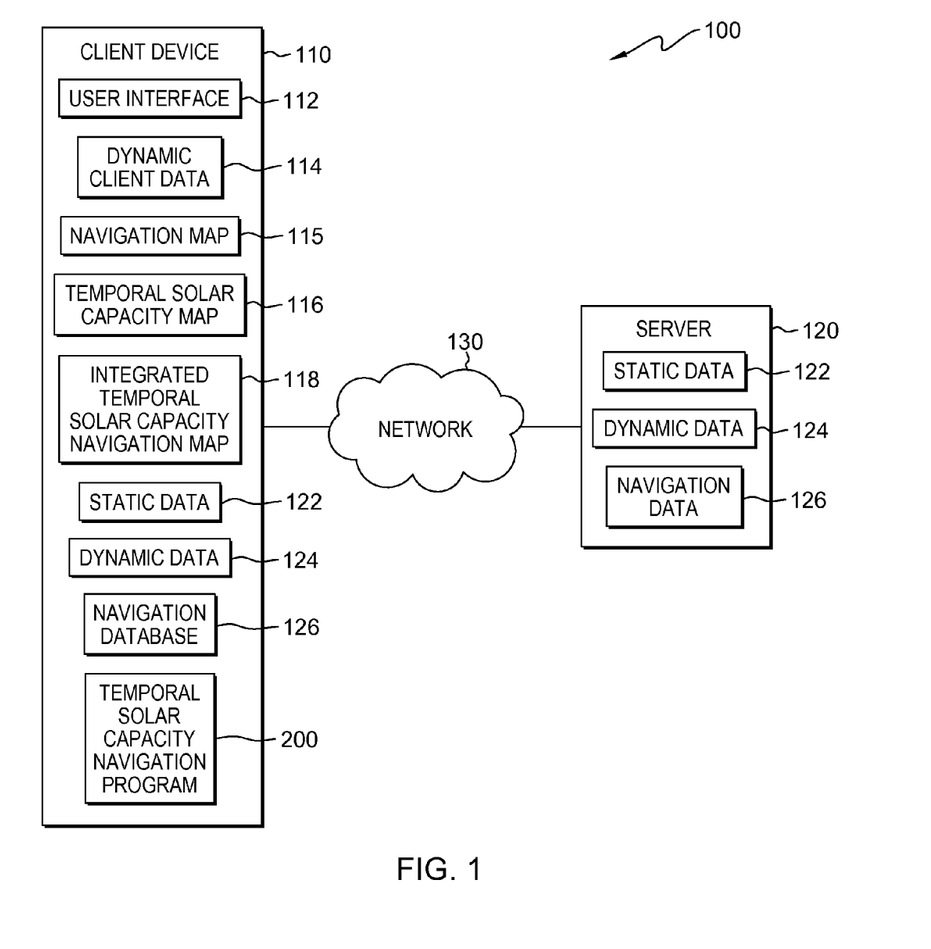
FIG. 1 is a functional block diagram illustrating a navigation system environment, in accordance with an embodiment of the present invention.

The present invention will now be described in detail with reference to the Figures. FIG. 1 is a functional block diagram illustrating a navigation system environment, generally designated 100, in accordance with one embodiment of the present invention. FIG. 1 provides only an illustration of one embodiment and does not imply any limitations with regard to the environments in which different embodiments may be implemented.

In the depicted embodiment, navigation system environment 100 includes client device 110 and server 120 interconnected over network 130. Navigation system environment 100 may include additional computing devices, mobile computing devices, servers, computers, storage devices, or other devices not shown.

Client device 110 may be a web server or any other electronic device or computing system capable of processing program instructions and receiving and sending data. In some embodiments, client device 110 may be a laptop computer, a tablet computer, a netbook computer, a personal computer (PC), a desktop computer, a personal digital assistant (PDA), a smart phone, or any programmable electronic device capable of communicating with network 130. In other embodiments, client device 110 may represent a server computing system utilizing multiple computers as a server system, such as in a cloud computing environment. In general, client device 110 is representative of any electronic device or combination of electronic devices capable of executing machine readable program instructions as described in greater detail with regard to FIG. 3, in accordance with embodiments of the present invention. Client device 110 contains user interface 112, dynamic client data 114, navigation map 115, temporal solar capacity map 116, integrated temporal solar capacity navigation map 118, static data 122, dynamic data 124, navigation database 126, and temporal solar capacity navigation program 200.

User interface 112 is a program that provides an interface between a user of client device 110 and a plurality of applications that reside on client device 110 (e.g., temporal solar capacity navigation program 200) and/or may be accessed over network 130. A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 sends and receives information to and from temporal solar capacity navigation program 200.

Dynamic client data 114 is data collected through sensors (e.g., light sensors, rain sensors, temperature, fuel economy, battery level, etc.) associated with client device 110 (e.g., installed sensors) that reflect real time weather conditions relative to the actual location of client device 110 and/or relevant data pertaining to the consumption of energy of client device 110. In the depicted embodiment, dynamic client data 114 resides on client device 110. Dynamic client data 114 provides data from installed sensors (e.g., vehicle sensors) to temporal solar capacity navigation program 200 to assist in real time updates to temporal solar capacity map 116 and integrated temporal solar capacity navigation map 118. In addition, dynamic client data 114 provides data from installed sensors that temporal solar capacity navigation program 200 utilizes to validate theoretical computations.

Navigation map 115 encompasses the driving directions and visuals aids (e.g., maps) associated with available navigation routes to a destination, (e.g., series of connected streets from an origin point to a destination point). Additionally, navigation map 115 includes additional navigation route features (e.g., points of interest, parking, fuel stations, charging stations, etc.) that accompany navigation routes. Navigation map 115 is an initial output of a temporal solar capacity navigation program 200. In the depicted embodiment, navigation map 115 resides on client device 110. In another embodiment, navigation map 115 resides on server 120. In some other embodiment, navigation map 115 resides on another server or computing device (not shown) connected over network 130, provided navigation map 115 is accessible by temporal solar capacity navigation program 200.

Temporal solar capacity map 116 is a map that estimates the amount of solar exposure associated with an area, in which the area encompasses the surrounding area associated with the origin and destination, based on at least one or more of: time, date, duration, dynamic client data 114 (e.g., vehicle sensor data), static data 122 (e.g., historical data of solar coverage), dynamic data 124 (e.g., weather conditions), solar position, and three dimensional maps (e.g., terrain map, topographic map geographic information system (GIS) maps). For example, temporal solar capacity map 116 covers an entire state or country. In another example temporal solar capacity map 116 covers an area that encompasses the routes connecting the origin and destination and surrounding area based on a specified range of maximum and or minimum coverage. Temporal solar capacity map 116 is an initial output of temporal solar capacity navigation program 200. In the depicted embodiment, temporal solar capacity map 116 resides on client device 110. In another embodiment, temporal solar capacity map 116 resides on server 120. In some other embodiment, temporal solar capacity map 116 resides on another server or computing device (not shown) connected over network 130, provided temporal solar capacity map 116 is accessible by temporal solar capacity navigation program 200.

Integrated temporal solar capacity navigation map 118 is a map that estimates the amount of solar exposure associated with available navigation routes taken to reach a destination. Integrated temporal solar capacity navigation map 118 provides solar exposure with driving directions and visual aids for available navigation routes for utilization by a user for driving and/or planning purposes. Integrated temporal solar capacity navigation map 118 is the output of temporal solar capacity navigation program 200, created once temporal solar capacity navigation program 200 combines navigation map 115 and temporal solar capacity map 116 into a single map. In the depicted embodiment, integrated temporal solar capacity navigation map 118 resides on client device 110. In another embodiment, integrated temporal solar capacity navigation map 118 resides on server 120. In some other embodiment, integrated temporal solar capacity navigation map 118 resides on another server or computing device (not shown) connected over network 130, provided integrated temporal solar capacity navigation map 118 is accessible by temporal solar capacity navigation program 200 and user interface 112.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with client device 110 over network 130. In other embodiments, server 120 may represent a server computing system utilizing multiple computers as a server system, such as in a cloud computing environment. Server 120 contains static data 122, dynamic data 124, and navigation database 126.

Static data 122 is historical data pertaining to solar exposure. For example, static data 122 includes a static map of solar exposure (e.g., solar map) with respect to time of year. The solar map provides monthly average daily total solar resource information of grid cells. The insolation values associated with the solar map, represent the solar resource available to a solar panel based on the preferred installation of photovoltaic (PV) systems (e.g., oriented due south at an angle from horizon equal to the latitude of the collector location). In the depicted embodiment static data 122 resides on server 120 and client device 110 (e.g., client device 110 includes a locally stored copy of static data 122 from server 120). As updates occur (e.g., release of a new solar map), the updated version of static data 122 replaces the local copy of static data 122 on client device 110. However, by storing a local copy of static data 122 on client device 110, in an embodiment in which a connection via network 130 is not available and/or lost, temporal solar capacity navigation program 200 utilizes the local copy of static data 122 for further processing until re-establishing a connection to server 120. In another embodiment, static data 122 resides on server 120, client device 110, or on another server or computing device (not shown) connected over network 130 provided that static data 122 is accessible by temporal solar capacity navigation program 200.

Dynamic data 124 includes data relative to a location that is subject to change over time and thus impacts solar exposure. In one embodiment, dynamic data 124 includes weather radar information (e.g. weather conditions, cloud cover, radar, temperatures, winds, etc.). For example, dynamic data 124 may include information from a weather service. In another embodiment, dynamic data 124 includes nearby sensor data (e.g., local weather radar and sensors). In some other embodiment, dynamic data 124 includes in-vehicle sensor data (e.g., dynamic client data 114). In yet some other embodiment, dynamic data 124 includes weather radar information, nearby sensor data, and/or in-vehicle sensor data. In the depicted embodiment, dynamic data 124 resides on server 120 and client device 110 (e.g., locally stored copy of dynamic data 124). As updates occur (e.g., changes to the forecast, cloud cover, weather radar), the updated version of dynamic data 124 replaces the local copy of dynamic data 124 on client device 110. However, by storing a local copy of dynamic data 124 on client device 110, in an embodiment in which a connection via network 130 is not available and/or lost, temporal solar capacity navigation program 200 utilizes the local copy of dynamic data 124 for further processing until re-establishing a connection to server 120. In some other embodiment, dynamic data 124 resides on server 120, client device 110, or on another server or computing device (not shown) connected over network 130 provided dynamic data 124 is accessible by temporal solar capacity navigation program 200.

Navigation database 126 is a database that includes the information a navigation system (e.g., temporal solar capacity navigation program 200) utilizes to determine routes to reach a destination. Navigation database 126 may include multiple databases, such as street network data (e.g., street configuration, connection conditions, attributes, etc.), background data (e.g., rivers, railroads, shores, etc.), site information (e.g., building names, addresses, structures, etc.), and voice data (e.g., voice guidance). In the depicted embodiment, navigation database 126 resides on server 120 and client device 110 (e.g., client device 110 includes a locally stored copy of navigation database 126). In some other embodiment, navigation database 126 resides on server 120, client device 110, or on another server or computing device (not shown) connected over network 130 provided that navigation database 126 is accessible by temporal solar capacity navigation program 200.

Network 130 may be a local area network (LAN), a wide area network (WAN) such as the Internet, a wireless local area network (WLAN), any combination thereof, or any combination of connections and protocols that will support communications between client device 110, server 120, and other computing devices and servers (not shown), in accordance with embodiments of the inventions. Network 130 may include wired, wireless, or fiber optic connections.

Temporal solar capacity navigation program 200 is a navigation system program and/or navigation system enhancement that determines driving routes based on the amount of solar exposure. Additionally, temporal solar capacity navigation program 200 includes future route planning software, to provide driving routes based on date and/or time relative to solar exposure. Temporal solar capacity navigation program 200 utilizes static data 122, dynamic data 124 and navigation database 126 to create integrated temporal solar capacity navigation map 118. Temporal solar capacity navigation program 200 updates integrated temporal solar capacity navigation map 118 based on additional factors (e.g., date, time, solar position, weather conditions, etc.) in real time and/or for future planning (e.g., predictions, forecasts, historical data, etc.). In the depicted embodiment, temporal solar capacity navigation program 200 resides on client device 110. In another embodiment, temporal solar capacity navigation program 200 resides on server 120. In some other embodiment, temporal solar capacity navigation program 200 resides on another server or computing device (not shown) provided that temporal solar capacity navigation program 200 has access to static data 122, dynamic data 124, and navigation database 126.

Figure 2:
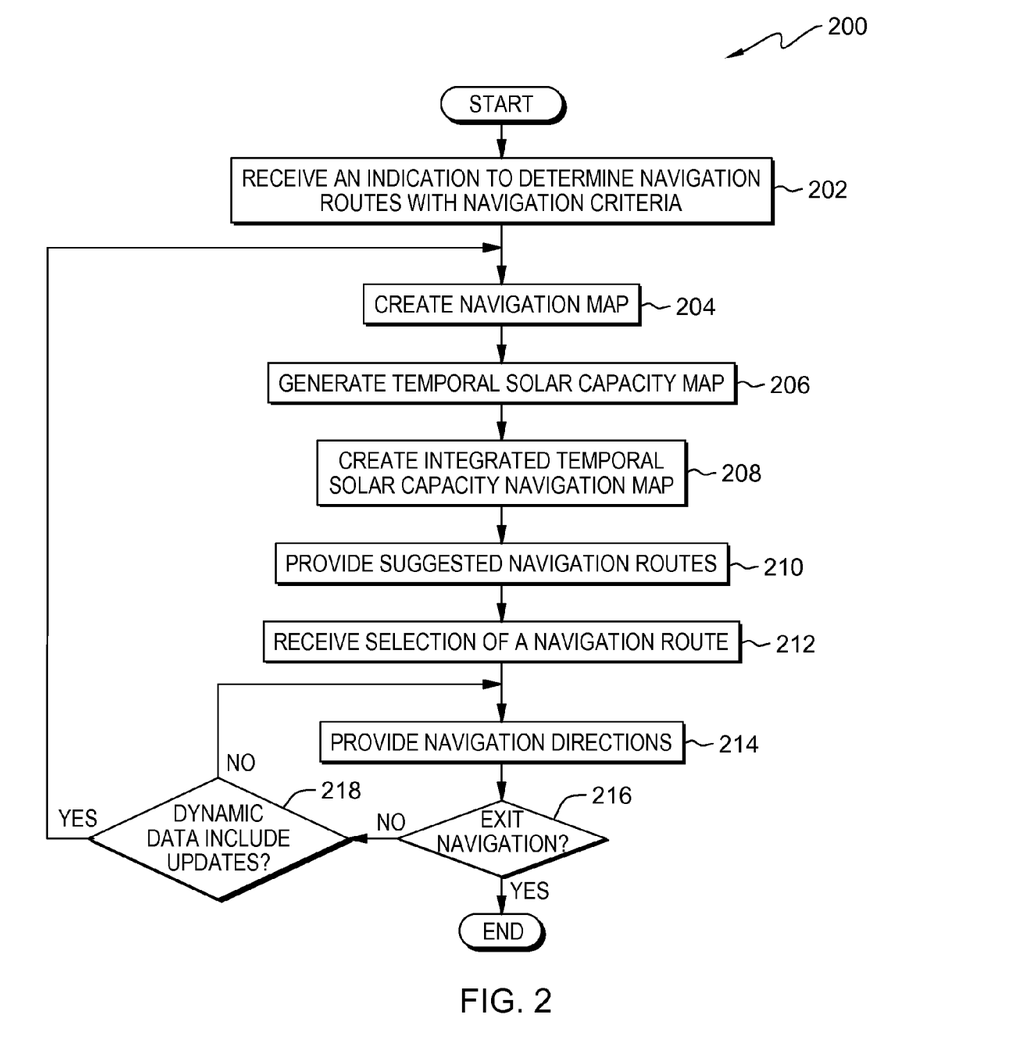
FIG. 2 is a flowchart depicting operational steps of a temporal solar capacity navigation program, on a computer within the navigation system environment of FIG. 1, for providing navigation routes based on an integrated temporal solar capacity map to maximize and/or minimize solar exposure, in accordance with an embodiment of the present invention.

FIG. 2 is a flowchart depicting operational steps of temporal solar capacity navigation program 200, a program for providing navigation routes based on integrated temporal solar capacity navigation map 118, to maximize and/or minimize solar exposure, in accordance with an embodiment of the present invention. In one embodiment, temporal solar capacity navigation program 200 is a navigation system program and/or navigation system enhancement installed on client device 110, which is capable of movement (e.g., include in a navigation system within a solar vehicle, a vehicle, a handheld GPS, an unmanned vehicle, etc.). For example, a solar vehicle may include an onboard navigation system that includes temporal solar capacity navigation program 200 to provide navigation routes real time while driving. In another embodiment, temporal solar capacity navigation program 200 is installed on client device 110 as part of route planning software (e.g., stationary, does not connect to GPS, etc.). For example, temporal solar capacity navigation program 200 is included within route planning software to identify routes prior to actual travel (e.g., offline).

In step 202, temporal solar capacity navigation program 200 receives an indication to determine navigation routes with navigation criteria. Temporal solar capacity navigation program 200 receives navigation criteria that includes at least a starting location, destination, date, time, and selection to identify routes based on a temporal solar capacity (e.g., maximum solar exposure, minimum solar exposure), from a user of client device 110 through user interface 112. In one embodiment, temporal solar capacity navigation program 200 receives an indication through user interface 112 to determine navigation routes immediately. For example, when driving in a vehicle (e.g., solar powered, combustion engine, hybrid, etc.) with an installed GPS and/or handheld GPS present, the user enters the starting location, destination and identify routes by temporal solar capacity and selects "Navigate to destination now." Temporal solar capacity navigation program 200 receives the starting location, destination, and select route by temporal solar capacity, based on user selections and receives the departure date and time as the current date and time of day from client device 110 (e.g., internal clock, GPS satellite data, etc.). Temporal solar capacity navigation program 200 initiates upon receipt of the selection to begin immediate navigation and receives the navigation route criteria In another embodiment, temporal solar capacity navigation program 200, receives additional navigation route criteria pertaining to a flexible date, fixed date, and/or departure time in the future (e.g., offline route planning) from a user through user interface 112. For example, a user with a solar vehicle is planning a trip to Orlando, Fla. from Philadelphia, Pa. while at home. The user enters a flexible departure date of August 22, plus or minus one day and selects navigation routes with maximum solar exposure. Through user interface 112, the user enters range criteria associated with the date (e.g., plus or minus a specified number of days, no selected departure date, etc.) and time (e.g., am, pm, departure time, plus or minus a specified number of hours around a departure time, etc.), and selects to create navigation routes based on the range criteria that surround the tentative departure date with respect to achieving maximum solar exposure. Upon completion, temporal solar capacity navigation program 200 receives an indication to plan navigation routes with the navigation route criteria and initiates.

In step 204, temporal solar capacity navigation program 200 creates navigation map 115. Temporal solar capacity navigation program 200 accesses navigation database 126 with the starting point and destination. Based on the two endpoints (i.e., starting point and destination), temporal solar capacity navigation program 200 accesses navigation database 126 and identifies roads that connect the two endpoints and road attributes (e.g., speed limits, mileage, toll road, highway, etc.) and builds one or more navigation routes. In one embodiment, temporal solar capacity navigation program 200 creates navigation map 115, which includes all possible navigation routes. In another embodiment, temporal solar capacity navigation program 200 creates navigation map 115 that includes navigation routes matching additional route planning criteria (e.g., shortest distance, faster route, highway, toll roads, etc.). Temporal solar capacity navigation program 200 creates the same version of navigation map 115 for immediate navigation and route planning instances.

In some other embodiment, temporal solar capacity navigation program 200 creates a new version of navigation map 115 after initial navigation to the destination begins, when temporal solar capacity navigation program 200 determines that dynamic client data 114 and/or dynamic data 124 include updates (decision 218, yes branch). Temporal solar capacity navigation program 200 maintains the original destination, but changes the starting point to the current GPS location of client device 110. In one embodiment, temporal solar capacity navigation program 200 creates navigation map 115 with new and/or additional navigation routes based off of the updated starting point. In another embodiment, temporal solar capacity navigation program 200 maintains the existing navigation routes and navigation map 115. For example, when driving in a remote location, only a single road may connect the current location and the destination, therefore alternate navigation routes do not exist and navigation map 115 remains unchanged.

In step 206, temporal solar capacity navigation program 200 creates temporal solar capacity map 116. In one embodiment, temporal solar capacity navigation program 200 creates temporal solar capacity map 116 based on static data 122 (e.g., historical solar exposure data) with respect to the navigation routes identified within navigation map 115 and a surrounding area. For example, a user is planning a trip next month. Temporal solar capacity navigation program 200 utilizes static data 122 (e.g., historical data collected) as dynamic data 124 (e.g., real time data) is not available. In some embodiments, temporal solar capacity navigation program 200 utilizes multiple sources for static data 122 (e.g., multiple years, weather predictors, etc.) and calculates an average for static data 122 thus using more data points to produce a more accurate representation of temporal solar capacity map 116. When utilizing temporal solar capacity navigation program 200 for route planning with flexible dates and times, temporal solar capacity navigation program 200 can create multiple instances of temporal solar capacity map 116 (e.g., one for each flexible date, one for each flexible departure time, etc.)

In another embodiment, temporal solar capacity navigation program 200 creates temporal solar capacity map 116 with respect to dynamic client data 114 (when installed on client device 110) and/or dynamic data 124. For example, temporal solar capacity navigation program 200 retrieves dynamic data 124 that includes weather radar and cloud coverage maps, and future forecasts (e.g., predicted future weather conditions based on tracking the movement of weather conditions over time to detect and apply trends). Cloud coverage maps relate to the opacity of the clouds (e.g., transparent, translucent, and opaque) that varies from cloud edge to cloud center and may include multiple layers within the atmosphere. The level of opacity determines the amount of sunlight that passes through the clouds versus the amount reflected, refracted, and/or absorbed, thus impacting the solar exposure. As dynamic client data 114 and/or dynamic data 124 occur in real time, temporal solar capacity navigation program 200 creates temporal solar capacity map 116 with known present weather conditions. Additionally, temporal solar capacity navigation program 200 validates the information and solar exposure calculated from dynamic data 124 with actual levels of solar exposure as measured at client device 110 within dynamic client data 114. In some embodiments, temporal solar capacity navigation program 200 adjusts temporal solar capacity map 116 based on the differences between calculated solar exposure and actual solar exposure. For example, the level of opacity within dynamic data 124 indicates solar exposure at fifty one percent, however temporal solar capacity navigation program 200 receives dynamic client data 114, as measured by onboard sensors within client device 110, at a solar exposure of forty-five percent. Temporal solar capacity navigation program 200 adjusts temporal solar capacity map 116 to reflect the actual data of forty-five percent.

In another embodiment, temporal solar capacity navigation program 200 creates temporal solar capacity map 116 by combining static data 122 and dynamic data 124 for various portions of temporal solar capacity map 116 (e.g., predefined ranges of time and distance based on the reliability of the data available). For example, a twenty-four hour weather forecast is more reliable than a three day forecast, five day forecast, etc. Temporal solar capacity navigation program 200 creates a portion of temporal solar capacity map 116 based on dynamic data 124, a second portion of temporal solar capacity map 116 based on combining dynamic data 124 and static data 122, and a third portion based on static data 122.

Temporal solar capacity navigation program 200 utilizes dynamic client data 114 to validate and/or adjust temporal solar capacity map 116 with real time data at client device 110 (e.g., determines variances between calculated and actual solar exposure values). For example, when traveling from New York to California, while navigation begins immediately, the actual time to travel the entire navigation route spans multiple days. Temporal solar capacity navigation program 200 utilizes dynamic data 124 to create temporal solar capacity map 116 spanning the projected distance coverable within a time frame (e.g., number of predefined hours) in which temporal solar capacity navigation program 200 determines dynamic data 124 to be reliable and incorporates adjustments based on dynamic client data 114. Temporal solar capacity navigation program 200 leverages static data 122 with future forecast available within dynamic data 124 to predict solar exposure for another portion of temporal solar capacity map 116. Temporal solar capacity navigation program 200 utilizes static data 122 to determine portions of temporal solar capacity map 116 outside of a timeframe (e.g., predefined threshold, exceeds the future forecast, thirty-six hours, days, etc.) as dynamic data 124 is less reliable and subject to sudden change.

In some embodiments, temporal solar capacity navigation program 200 additionally calculates the position of the sun with respect to the time of day, time or year and geographic location and incorporates the information into temporal solar capacity map 116. For example, the amount of solar exposure at noon is greater than at dusk, the time associated with the amount of solar exposure in winter is shorter than summer, and seasons are opposite when in the southern hemisphere versus the northern hemisphere. In one embodiment, temporal solar capacity navigation program 200 calculates the position of the sun based on the current time and date from client device 110 and/or GPS satellite date. In another embodiment, temporal solar capacity navigation program 200 calculates the position of the sun based on the flexible and/or fixed dates and times entered by a user through the route planning function. In addition, the position of the sun impacts the angle of arrival of the solar exposure at a vehicle (e.g. solar panel) and changes the amount of solar exposure at location (e.g., locations initially in the sun may change to shade with minimal solar exposure as the day progresses), thus impacting charging capabilities. Temporal solar capacity navigation program 200 updates the initial versions of temporal solar capacity map 116 with the additional solar exposure information based on the position of the sun.

In other embodiments, temporal solar capacity navigation program 200 additionally incorporates three dimensional maps (e.g., terrain maps, topographic maps, three dimensional geographic information system (GIS) maps) into temporal solar capacity map 116. Temporal solar capacity navigation program 200 applies a lighting algorithm to the three dimensional maps taking into account the position of the sun. Temporal solar capacity navigation program 200 determines areas with varying degrees of solar exposure, and projects future solar exposure as time progresses that are incorporated within temporal solar capacity map 116. For example, in a city the location and height of features of the city (e.g., buildings, parks, bridges, etc.) varies. Using the position of the sun with respect to the fixed heights and sizes of the features of the city, temporal solar capacity navigation program 200 applies the position of the sun (angle of arrival of the rays of light with respect to the city features) and determines areas in the sun and shade (e.g., forecasts shadows created on the ground by the city features) and changes to the areas that occur throughout the day, thus determining solar exposure.

In some embodiments, temporal solar capacity navigation program 200 updates temporal solar capacity map 116 after initial navigation begins to reflect the changes within dynamic client data 114 and/or dynamic data 124 that occur over time. In one embodiment, temporal solar capacity navigation program 200 retrieves dynamic data 124 at scheduled intervals (e.g., time, mileage, etc.) and updates temporal solar capacity map 116. In another embodiment, temporal solar capacity navigation program 200 retrieves dynamic data 124 when reaching an intersection point of navigation routes within integrated temporal solar capacity navigation map 118 in which the user of client device 110 may select an alternate navigation route. Temporal solar capacity navigation program 200 retrieves dynamic data 124 to verify the solar exposure available in the multiple navigations paths (e.g. user may alter navigation route to maximize solar exposure) and updates temporal solar capacity map 116.

In another embodiment, temporal solar capacity navigation program 200 updates temporal solar capacity map 116 when the variance between dynamic client data 114 and dynamic data 124 exceeds a threshold. For example, temporal solar capacity navigation program 200 calculates a charging rate of a battery associated with client device 110 based on dynamic data 124. However, temporal solar capacity navigation program 200 calculates an actual charging rate that is twenty percent less based on dynamic client data 114 that persists at the lower rate for twenty minutes. Based on the variance, temporal solar capacity navigation program 200 initiates an update to dynamic data 124. In yet some other embodiment, temporal solar capacity navigation program 200 receives an indication from the user of client device 110 to retrieve dynamic data 124 and updates temporal solar capacity map 116.

In step 208, temporal solar capacity navigation program 200 creates integrated temporal solar capacity navigation map 118. In one embodiment, temporal solar capacity navigation program 200 creates a single instance of integrated temporal solar capacity navigation map 118 (e.g., immediately navigating to a destination, fixed date and time). In another embodiment, temporal solar capacity navigation program 200 creates multiple instances of integrated temporal solar capacity navigation map 118 based on flexible dates and/or times. In one embodiment, temporal solar capacity navigation program 200 overlays temporal solar capacity map 116 onto navigation map 115 to create integrated temporal solar capacity navigation map 118 (e.g., view large areas such as for parking purposes). In some embodiments, temporal solar capacity navigation program 200 receives a long term value (e.g., hours, days, weeks, etc.) from the user through user interface 112. In another embodiment, temporal solar capacity navigation program 200 calculates a long term value based on the time estimates to cover the distance between the starting point and destination. Temporal solar capacity navigation program 200 predicts the solar exposure over time based on the long term value. Temporal solar capacity navigation program 200 displays areas that match the maximum solar exposure over the course of the long term value. In another embodiment, temporal solar capacity navigation program 200 displays the maximum and minimum solar exposure over the areas as a time progression indicating the increase and decrease in solar exposure over time.

For example, the user of a solar vehicle reaches a destination and initiates a feature to locate parking with maximum solar exposure in order to charge the vehicle battery as two parking areas are available, one in the shade and one with full solar exposure. Temporal solar capacity navigation program 200 receives a long term value of four hours from the user through user interface 112. Temporal solar capacity navigation program 200 determines the parking area currently in the shade changes to full solar exposure after a half an hour and remains at maximum solar exposure for the next 3 hours, while the parking area currently with full solar exposure after the same half an hour changes to full shade for the remainder of the long term value and beyond. Temporal solar capacity navigation program 200 displays the two areas based on the long term value that maximizes solar exposure, thus showing the current parking available in the shade to be the preferred parking area.

In another embodiment, temporal solar capacity navigation program 200 merges temporal solar capacity map 116 and navigation map 115 to create integrated temporal solar capacity navigation map 118. Temporal solar capacity navigation program 200 determines the locations within temporal solar capacity map 116 that correspond to the navigation routes included in navigation map 115 (e.g., geographic coordinates, initially overlay maps with the same scale, etc.). Temporal solar capacity navigation program 200 extracts the solar exposure values from temporal solar capacity map 116 and stores the solar exposure values with the data points that comprise the navigation routes of navigation map 115, thus creating integrated temporal solar capacity navigation map 118. Temporal solar capacity navigation program 200 updates the manner in which the navigation routes are displayed to reflect the incorporation of temporal solar capacity map 116 to maximize and/or minimize solar exposure. For example, temporal solar capacity navigation program 200 displays different colors along the associated navigation routes as the solar exposure varies (e.g., yellow indicates high solar exposure and grey indicates low solar exposure, green indicates high solar exposure, yellow indicates moderate solar exposure, and red indicates low solar exposure). In another example, temporal solar capacity navigation program 200 displays different markings (e.g., "+" indicated high solar exposure, "−" indicates low solar exposure, etc.) along the associated navigation routes as the solar exposure varies.

In step 210, temporal solar capacity navigation program 200 provides suggested navigation routes based on integrated temporal solar capacity navigation map 118. In one embodiment, temporal solar capacity navigation program 200 provides suggested navigation routes based on solar exposure (e.g., maximum, minimum, duration). In another embodiment, temporal solar capacity navigation program 200 provides suggested navigation routes based on solar exposure and additional navigation criteria (e.g., fastest time, shortest mileage, minimal charging station, single charge, toll roads, etc.). In some other embodiment, temporal solar capacity navigation program 200 provides suggested navigation routes based on solar exposure, additional navigation criteria, and available charging stations.

For example, temporal solar capacity navigation program 200 identifies the navigation routes within integrated temporal solar capacity navigation map 118 that indicate a reduction in solar exposure. Temporal solar capacity navigation program 200 receives dynamic client data 114 pertaining to the amount of energy consumed, rate of energy consumption, a charge rate, and projected mileage (e.g., distance that may be covered based on the current state of consumption and charging prior to depleting the battery). Temporal solar capacity navigation program 200 combines dynamic client data 114 with the location of charging stations along the navigation routes to determine when the maximum solar exposure will no longer be capable of maintain as adequate charge on the battery of client device 110, and thus necessitating a stop at a charging station. Temporal solar capacity navigation program 200 identifies a navigation route that allows the user of client device 110 to continue traveling with minimal delays by maximizing resources.

In one embodiment temporal solar capacity navigation program 200 displays the suggested navigation routes in a ranked order for selection on a display associated with client device 110. Temporal solar capacity navigation program 200 identifies the differences between the navigation routes for viewing by the user of client device 110. In another embodiment, temporal solar capacity navigation program 200 selects and vocalizes the highest ranked navigation route to the user of client device 110. Temporal solar capacity navigation program 200 monitors for a selection from the user of client device 110, confirming the selection of a suggested navigation route.

In another embodiment, temporal solar capacity navigation program 200 suggests navigation routes based on a flexible date and/or flexible times to meet navigation criteria. For example, a user initially entered a departure date and time of August 22 at 9 am with a flexible date of plus or minus one day and flexible time of morning. Temporal solar capacity navigation program 200 creates an instance of integrated temporal solar capacity navigations map for each of the three days. Temporal solar capacity navigation program 200 assesses the individual instance of integrated temporal solar capacity navigation map 118 and determines the date and time that best matches the additional navigation criteria identified by the user through user interface 112. Temporal solar capacity navigation program 200 suggests the best match as the navigation route for selection.

In step 212, temporal solar capacity navigation program 200 receives a selection of a navigation route from a user through user interface 112 based on integrated temporal solar capacity navigation map 118. In one embodiment, temporal solar capacity navigation program 200 receives a selection in response to the user of client device 110 through user interface 112, depressing a physical and/or virtual button (e.g., hardwired through electrical circuitry and software, virtual touchscreen symbol, menu selection, etc.). In another embodiment, temporal solar capacity navigation program 200 receives a selection in response to the user of client device 110 vocalizing a selection (e.g., answers "yes," "continue," etc., in response to a question regarding the selected navigation route). In some other embodiment, temporal solar capacity navigation program 200 receives a selection from the list of navigation routes through the route planning function.

In step 214, temporal solar capacity navigation program 200 provides navigation directions. Temporal solar capacity navigation program 200 provides navigation directions associated with the selected navigation route (e.g., voice commands and/or animated visual display). Temporal solar capacity navigation program 200 updates the navigation directions as determined by the navigation system based on the GPS location with respect to the selected navigation route. Temporal solar capacity navigation program 200 continues to provide navigation directions associated with the selected navigation route until temporal solar capacity navigation program 200 reaches the destination and/or the user enters input through user interface 112 indicating navigation directions are no longer necessary (e.g., user exits navigation, creates a new route, etc.). In an alternate embodiment, temporal solar capacity navigation program 200 provides a list of navigation directions instead of real-time directions. For example, when utilizing the offline route planning functions of temporal solar capacity navigation program 200, displays a list of the navigational directions as steps with the solar exposure, mileage, and time predictions, that the user may save, print, send to an e-mail address, etc., for later user.

In decision 216, temporal solar capacity navigation program 200 determines whether client device 110 exits navigation. In one embodiment, temporal solar capacity navigation program 200, based on the GPS information, determines the location of client device 110 to be the same as the destination (e.g., reaches the end of the driving route) and exits. In another embodiment, temporal solar capacity navigation program 200 receives an indication from the user though user interface 112 to exit navigation mode (e.g., selects to stop navigation to the destination, exits navigation, creates a new route, etc.). In some other embodiment, temporal solar capacity navigation program 200 receives an indication through user interface 112 indicating completion of route planning (e.g., closes installed route planning software, closes web based route planning software, save the route, selects create new route, etc.). When the current location of client device 110 is not the same as the destination, temporal solar capacity navigation program 200 determines client device 110 has not reached the destination and navigation continues. In another embodiment, temporal solar capacity navigation program 200 does not receive an indication to exit navigation, and temporal solar capacity navigation program 200 determines that navigation continues.

If temporal solar capacity navigation program 200 determines client device 110 exits navigation (decision 216, yes branch), then temporal solar capacity navigation program 200 completes. If temporal solar capacity navigation program 200 determines client device 110 does not exit navigation (decision 216, no branch), then temporal solar capacity navigation program 200 determines whether dynamic client data 114 and/or dynamic data 124 include updates (decision 218).

In decision 218, temporal solar capacity navigation program 200 determines whether dynamic client data 114 and/or dynamic data 124 include updates. In one embodiment, temporal solar capacity navigation program 200 determines dynamic client data 114 includes updates. In one embodiment, temporal solar capacity navigation program 200 receives changes to dynamic client data 114 (e.g., decrease in the charging rate, low battery, light sensor activates head-lights, etc.) in real-time. In another embodiment, temporal solar capacity navigation program 200 receives changes to dynamic client data 114 at scheduled intervals. In one embodiment, temporal solar capacity navigation program 200 determines dynamic client data 114 includes an update when the changes to dynamic client data 114 result in a variance between previous calculations and the current calculations outside of a threshold. For example, the user comes to an underground tunnel that covers ten miles, the light sensors turn on the headlights, power consumption increases, and the charging rate drops. Temporal solar capacity navigation program 200 determines a variance between the previous values of power consumption and charging, and determines dynamic client data 114 includes updates.

In another embodiment, temporal solar capacity navigation program 200 determines that dynamic data 124 includes updates (e.g., changes to radar weather maps, cloud cover, etc.). In one embodiment, temporal solar capacity navigation program 200 retrieves dynamic data 124 at scheduled intervals. In another embodiment, temporal solar capacity navigation program 200 retrieves dynamic data 124 when reaching an intersection point of navigation routes within integrated temporal solar capacity navigation map 118 in which the user of client device 110 may select and alternate navigation route. Temporal solar capacity navigation program 200 retrieves dynamic data 124 and compares the current version of dynamic data 124 with the retrieved version to identify updates (e.g., changes) that ultimately impacts temporal solar capacity map 116 and integrated temporal solar capacity navigation map 118 (e.g., outside of a threshold). In another embodiment, temporal solar capacity navigation program 200 updates temporal solar capacity map 116 when the variance between calculated values based off of dynamic client data 114 and dynamic data 124 exceeds a threshold. In some other embodiment, temporal solar capacity navigation program 200 determines both dynamic client data 114 and dynamic data 124 include updates.

If temporal solar capacity navigation program 200 determines dynamic client data 114 and/or dynamic data 124 include updates (decision 218, yes branch), then temporal solar capacity navigation program 200 creates navigation map 115 (step 204). If temporal solar capacity navigation program 200 determines dynamic client data 114 and/or dynamic data 124 do not include updates (decision 218, no branch), then temporal solar capacity navigation program 200 provides navigation directions (step 214).

Figure 3:
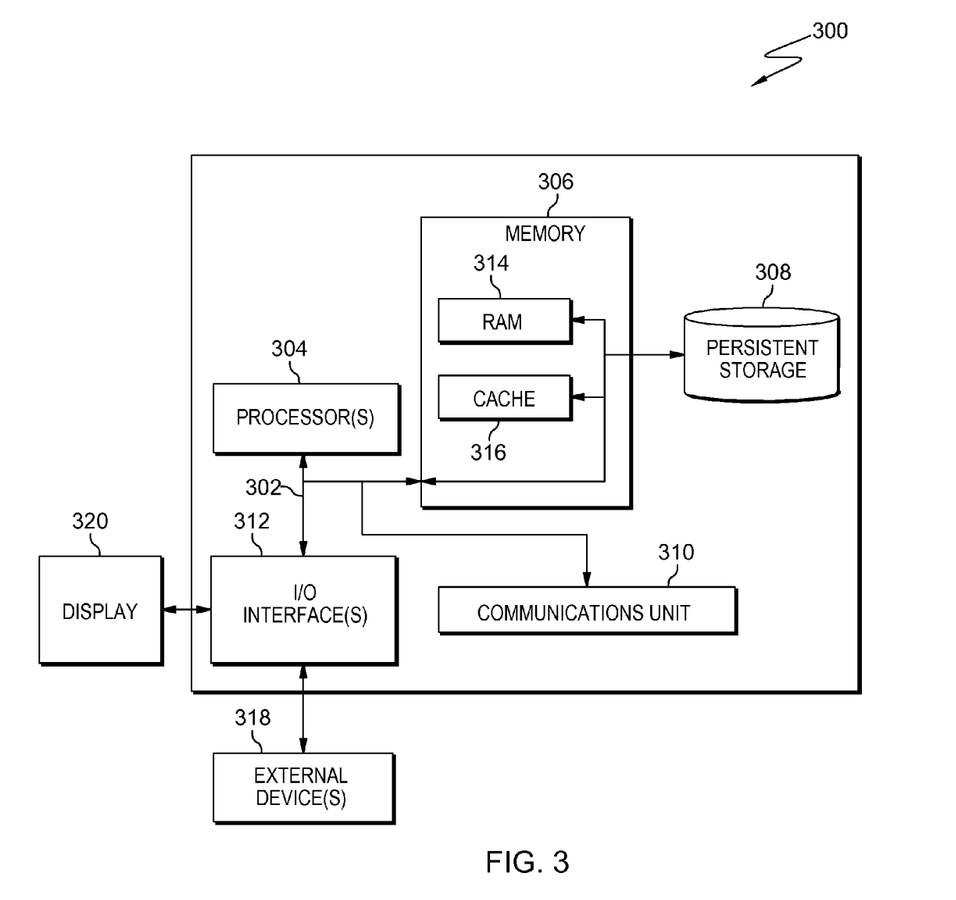
FIG. 3 is a block diagram of components of the computer executing the temporal solar capacity navigation program, in accordance with an embodiment of the present invention.

FIG. 3 depicts a block diagram of components of computer 300 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM) 314. In general, memory 306 can include any suitable volatile or non-volatile computer readable storage media. Cache 316 is a fast memory that enhances the performance of computer processor(s) 304 by holding recently accessed data, and data near accessed data, from memory 306.

User interface 112, dynamic client data 114, navigation map 115, temporal solar capacity map 116, integrated temporal solar capacity navigation map 118, static data 122, dynamic data 124, and navigation database 126 may be stored in persistent storage 308 and in memory 306 for execution and/or access by one or more of the respective computer processor(s) 304 via cache 316. In an embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. User interface 112, dynamic client data 114, navigation map 115, temporal solar capacity map 116, integrated temporal solar capacity navigation map 118, static data 122, dynamic data 124, and navigation database 126 may be downloaded to persistent storage 308 through communications unit 310.

I/O interface(s) 312 allows for input and output of data with other devices that may be connected to computer 300. For example, I/O interface(s) 312 may provide a connection to external device(s) 318, such as a keyboard, a keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., user interface 112, dynamic client data 114, navigation map 115, temporal solar capacity map 116, integrated temporal solar capacity navigation map 118, static data 122, dynamic data 124, and navigation database 126, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining temporal solar capacity navigation routes, the method comprising:
   receiving, by one or more computer processors, navigation criteria that includes at least a starting location, a destination, a date, a time, and a temporal solar capacity;
   determining, by one or more computer processors, one or more navigation routes based on the received navigation criteria and a global positioning system;
   identifying, by one or more computer processors, in-vehicle sensor data that reflects real time weather conditions and actual solar exposure values;
   creating, by one or more computer processors, a temporal solar capacity navigation map based on the received navigation criteria and the identified in-vehicle sensor data;
   determining, by one or more computer processors, one or more suggested navigation routes from the determined one or more navigation routes based on the created temporal solar capacity navigation map;
   receiving, by one or more computer processors, a navigation route from the determined one or more suggested navigation routes;
   receiving, by one or more computer processors, dynamic data from a computing device associated with the received navigation route;
   determining, by one or more computer processors, an actual temporal solar capacity based on the received dynamic data associated with the received navigation route;
   determining, by one or more computer processor, a variance between the determined actual temporal solar capacity and a calculated temporal solar capacity that corresponds to the received navigation route wherein the variance is a percentage difference between a charging rate based on the calculated temporal solar capacity and an actual charging rate based on the determined actual solar capacity;
   determining, by one or more computer processors, whether the variance exceeds a threshold; and
   responsive to determining the variance exceeds the threshold, updating, by one or more computer processor, the created temporal solar capacity navigation map based on the determined variance.

2. The method of claim 1, wherein creating the temporal solar capacity navigation map based on the received navigation criteria further comprises:
   creating, by one or more computer processors, a navigation map based on the starting location and the destination, wherein the created navigation map includes the one or more determined navigation routes;
   identifying, by one or more computer processors, static data associated with the created navigation map, wherein the identified static data includes a solar map with respect to time of year that provides monthly average daily total insolation values; and
   creating, by one or more computer processors, the temporal solar capacity navigation map by applying the identified static data to the created navigation map.

3. The method of claim 2, further comprising:
   identifying, by one or more computer processors, dynamic data associated with the created navigation map, wherein the dynamic data includes: weather prediction information associated with one or more sensors, weather radar, cloud coverage, and future forecasts that track the movement of weather conditions over time;
   calculating, by one or more computer processors, temporal solar capacity of the created navigation map based on the identified dynamic data; and
   updating, by one or more computer processors, the created temporal solar capacity navigation map with the calculated temporal solar capacity for the created navigation map based on the received dynamic data.

4. The method of claim 3, further comprising:
   determining, by one or more computer processors, a position of a sun based on one or more of: the date and the time included in the received navigation criteria;
   identifying, by one or more computer processors, a three dimensional map associated with the created navigation map, wherein the three dimensional map includes a terrain map, a topographic map, and a geographic information system map;
   calculating, by one or more computer processors, a temporal solar capacity by applying a lighting algorithm to the identified three dimensional map based on the determined position of the sun, wherein the lighting algorithm determines varying degrees of solar exposure; and updating, by one or more computer processors, the created temporal solar capacity navigation map based on the calculated temporal solar capacity by applying the lighting algorithm to the identified three dimensional map based on the determined position of the sun.

5. The method of claim 1, wherein determining, one or more suggested navigation routes based on the created temporal solar capacity navigation map further comprises one or more of the following:

determining, by one or more computer processors, a shortest navigation route with respect to optimizing charging of a computing device based on the created temporal solar capacity navigation map, wherein the optimized charging determines a projected mileage based on a rate of energy consumption and a charge rate, based on a maximum solar exposure provided by the created temporal solar capacity navigation map that maintains an adequate charge on a battery without a stop at a charging station;

determining, by one or more computer processors, a fastest navigation route with respect to optimizing charging of the computing device based on the created temporal solar capacity navigation map;

determining, by one or more computer processors, a single charge navigation route with respect to optimizing charging of the computing device based on the created temporal solar capacity navigation map; and determining, by one or more computer processors, a minimal charging station route with respect to optimizing charging of the computing device based on the created temporal solar capacity navigation map.

6. The method of claim 1, further comprising:

identifying, by one or more computer processors, an update to dynamic data on a server, wherein the dynamic data is associated with the created temporal solar capacity navigation map;

updating, by one or more computer processors, the created temporal solar capacity navigation map with the identified update to the dynamic data; and suggesting, by one or more computer processors, changes to the received navigation route.

7. A computer program product for determining temporal solar capacity navigation routes, the computer program product comprising:

one or more computer readable storage media and program instructions stored on the one or more computer readable storage media, the program instructions comprising:

program instructions to receive navigation criteria that includes at least a starting location, a destination, a date, a time, and a temporal solar capacity;

program instructions to determine one or more navigation routes based on the received navigation criteria and a global positioning system;

program instructions to identify in-vehicle sensor data that reflects real time weather conditions and actual solar exposure values;

program instructions to create a temporal solar capacity navigation map based on the received navigation criteria and the identified in-vehicle sensor data;

program instructions to determine one or more suggested navigation routes from the determined one or more navigation routes based on the created temporal solar capacity navigation map;

program instructions to receive a navigation route;

program instructions to receive dynamic data from a computing device associated with the received navigation route;

program instructions to determine an actual temporal solar capacity based on the received dynamic data associated with the received navigation route;

program instructions to determine a variance between the determined actual temporal solar capacity and a calculated temporal solar capacity that corresponds to the received navigation route wherein the variance is a percentage difference between a charging rate based on the calculated temporal solar capacity and an actual charging rate based on the determined actual solar capacity;

program instructions to determine whether the variance exceeds a threshold; and responsive to determining the variance exceeds the threshold, program instructions to update the created temporal solar capacity navigation map based on the determined variance.

8. The computer program product of claim 7, wherein to create the temporal solar capacity navigation map based on the received navigation criteria further comprises program instructions, stored on the one or more computer readable storage media, to:

create a navigation map based on the starting location and the destination, wherein the created navigation map includes the one or more determined navigation routes;

identify static data associated with the created navigation map, wherein the identified static data includes a solar map with respect to time of year that provides monthly average daily total insolation values; and create the temporal solar capacity navigation map by applying the identified static data to the created navigation map.

9. The computer program product of claim 8, further comprising program instructions, stored on the one or more computer readable storage media, to:

identify dynamic data associated with the created navigation map, wherein the dynamic data includes: weather prediction information associated with one or more sensors, weather radar, cloud coverage, and future forecasts that track the movement of weather conditions over time;

calculate temporal solar capacity of the created navigation map based on the identified dynamic data; and update the created temporal solar capacity navigation map with the calculated temporal solar capacity for the created navigation map based on the received dynamic data.

10. The computer program product of claim 9, further comprising program instructions, stored on the one or more computer readable storage media, to:

determine a position of a sun based on one or more of: the date and the time included in the received navigation criteria;

identify a three dimensional map associated with the created navigation map, wherein the three dimensional map includes a terrain map, a topographic map, and a geographic information system map;

calculate a temporal solar capacity by applying a lighting algorithm to the identified three dimensional map based on the determined position of the sun, wherein the lighting algorithm determines varying degrees of solar exposure; and update the created temporal solar capacity navigation map based on the calculated temporal solar capacity by applying the lighting algorithm to the identified three dimensional map based on the determined position of the sun.

11. The computer program product of claim 7, wherein to determine, one or more suggested navigation routes based on the created temporal solar capacity navigation map further comprises one or more of the following program instructions, stored on the one or more computer readable storage media, to:

determine a shortest navigation route with respect to optimizing charging of a computing device based on the created temporal solar capacity navigation map, wherein the optimized charging determines a projected mileage based on a rate of energy consumption and a charge rate, based on a maximum solar exposure provided by the created temporal solar capacity navigation map that maintains an adequate charge on a battery without a stop at a charging station;

determine a fastest navigation route with respect to optimizing charging of the computing device based on the created temporal solar capacity navigation map;

determine a single charge navigation route with respect to optimizing charging of the computing device based on the created temporal solar capacity navigation map; and determine a minimal charging station route with respect to optimizing charging of the computing device based on the created temporal solar capacity navigation map.

12. The computer program product of claim 7 further comprising program instructions, stored on the one or more computer readable storage media, to:

identify an update to dynamic data on a server, wherein the dynamic data is associated with the created temporal solar capacity navigation map;

update the created temporal solar capacity navigation map with the identified update to the dynamic data; and suggest changes to the received navigation route.

13. A computer system for determining temporal solar capacity navigation routes, the computer system comprising:

one or more computer processors, one or more computer readable storage media, and program instructions stored on the computer readable storage media for execution by at least one of the one or more processors, the program instructions comprising:

program instructions to receive navigation criteria that includes at least a starting location, a destination, a date, a time, and a temporal solar capacity;

program instructions to determine one or more navigation routes based on the received navigation criteria and a global positioning system;

program instructions to identify in-vehicle sensor data that reflects real time weather conditions and actual solar exposure values;

program instructions to create a temporal solar capacity navigation map based on the received navigation criteria and the identified in-vehicle sensor data;

program instructions to determine one or more suggested navigation routes from the determined one or more navigation routes based on the created temporal solar capacity navigation map;

program instructions to receive a navigation route;

program instructions to receive dynamic data from a computing device associated with the received navigation route;

program instructions to determine an actual temporal solar capacity based on the received dynamic data associated with the received navigation route;

program instructions to determine a variance between the determined actual temporal solar capacity and a calculated temporal solar capacity that corresponds to the received navigation route wherein the variance is a percentage difference between a charging rate based on the calculated temporal solar capacity and an actual charging rate based on the determined actual solar capacity;

program instructions to determine whether the variance exceeds a threshold; and responsive to determining the variance exceeds the threshold, program instructions to update the created temporal solar capacity navigation map based on the determined variance.

14. The computer system of claim 13, wherein to create the temporal solar capacity navigation map based on the received navigation criteria further comprises program instructions, stored on the one or more computer readable storage media, to:

create a navigation map based on the starting location and the destination, wherein the created navigation map includes the one or more determined navigation routes;

identify static data associated with the created navigation map, wherein the identified static data includes a solar map with respect to time of year that provides monthly average daily total insolation values; and create the temporal solar capacity navigation map by applying the identified static data to the created navigation map.

15. The computer system of claim 14, further comprising program instructions, stored on the one or more computer readable storage media, to:

identify dynamic data associated with the created navigation map, wherein the dynamic data includes: weather prediction information associated with one or more sensors, weather radar, cloud coverage, and future forecasts that track the movement of weather conditions over time;

calculate temporal solar capacity of the created navigation map based on the identified dynamic data; and update the created temporal solar capacity navigation map with the calculated temporal solar capacity for the created navigation map based on the received dynamic data.

16. The computer system of claim 15, further comprising program instructions, stored on the one or more computer readable storage media, to:

determine a position of a sun based on one or more of: the date and the time included in the received navigation criteria;

identify a three dimensional map associated with the created navigation map, wherein the three dimensional map includes a terrain map, a topographic map, and a geographic information system map;

calculate a temporal solar capacity by applying a lighting algorithm to the identified three dimensional map based on the determined position of the sun, wherein the lighting algorithm determines varying degrees of solar exposure; and update the created temporal solar capacity navigation map based on the calculated temporal solar capacity by applying the lighting algorithm to the identified three dimensional map based on the determined position of the sun.

17. The computer system of claim 13, wherein to determine, one or more suggested navigation routes based on the created temporal solar capacity navigation map further comprises one or more of the following program instructions, stored on the one or more computer readable storage media, to:

determine a shortest navigation route with respect to optimizing charging of a computing device based on the created temporal solar capacity navigation map, wherein the optimized charging determines a projected mileage based on a rate of energy consumption and a charge rate, based on a maximum solar exposure provided by the created temporal solar capacity navigation map that maintains an adequate charge on a battery without a stop at a charging station;

determine a fastest navigation route with respect to optimizing charging of the computing device based on the created temporal solar capacity navigation map;

determine a single charge navigation route with respect to optimizing charging of the computing device based on the created temporal solar capacity navigation map; and determine a minimal charging station route with respect to optimizing charging of the computing device based on the created temporal solar capacity navigation map.

* * * * *